United States Patent [19]

Chappell et al.

[11] 4,020,580
[45] May 3, 1977

[54] COMPOSITE FISHERMAN'S LURE

[76] Inventors: Herman Eli Chappell; Ocia L. Bettes, both of P.O. Box 42, Guthrie, Okla. 73044

[22] Filed: Jan. 20, 1976

[21] Appl. No.: 650,675

[52] U.S. Cl. ............................................. 43/17.5
[51] Int. Cl.² ...................................... A01K 85/00
[58] Field of Search .................................. 43/17.5

[56] References Cited
UNITED STATES PATENTS

| | | | |
|---|---|---|---|
| 2,826,850 | 3/1958 | Laudan | 43/17.5 |
| 3,079,721 | 3/1963 | Smith | 43/17.5 |
| 3,177,604 | 4/1965 | Ewing | 43/17.5 |
| 3,213,562 | 10/1965 | Salvin et al. | 43/17.5 X |
| 3,510,978 | 5/1970 | Murdock | 43/17.5 X |

Primary Examiner—Louis G. Mancene
Assistant Examiner—Daniel J. Leach

[57] ABSTRACT

A composite fishing lure comprising an outer transparent container adapted to receive live bait and having apertures therein to permit entry and exit of water, an inner transparent container concentric with the outer container and secured thereto, illuminating means within the inner container, electrical insulating means to prevent entry of water to the inner container and control means for said illuminating means.

1 Claim, 2 Drawing Figures

COMPOSITE FISHERMAN'S LURE

The invention relates to a composite fisherman's lure. The primary object of the invention is to provide a simple and effective composite lure for attracting fish by different means forming part of the composite lure.

The lure is so designed as to provide diverse means for attracting fish including the following:

1. Light from a source carried by the lure;
2. Blinking means for the light to more readily attract the fish;
3. A bright colored object forming part of the composite lure which may be the lid of an outer jar forming part of the lure, which jar encloses various elements of the lure such as the light, bait, which may be either live or dead, and other portions of the device which will be more fully described hereinafter;
4. A holder for live bait such as minnows which is separate and insulated from the light source and battery so that no water will contact the electrical portions of the device.
5. A holder for dead bait sometimes referred to as "stink bait", which holder is below the portion occupied by the live bait and is perforated to permit water to flow freely through the device;
6. The entire device preferably flexibly or swingably suspended from a boat, wharf, or other supporting means so as to permit motion of the lure, caused by waves, tide or wind.

In a specific embodiment of our invention, the composite fisherman's lure consists of two jars, one a large one and the other a small one. The small jar may be of glass and the large one of plastic material. The small glass jar fits inside the larger plastic jar and holds a battery and bulb for light to attract fish. The large jar has holes or slits in the lid for water to enter from a lake or pond to sustain live minnows which are held captive within the large jar. The lid of the small jar is fastened to the underside of the big jar lid in such a way that the small jar may be screwed into the small lid to keep water from getting into the battery and bulb. A stink bait holder is provided on the bottom of the big jar. The stink bait holder is perforated so the bait will be in the water.

Thus the lure of this invention includes means to attract fish, as previously set forth, namely, light, live minnows, stink bait, motion, a bright colored lid, and a blinking light. An on-off switch is attached to the large jar to provide means to turn the light on and off at the will of an operator.

The invention will be more readily understood by reference to the accompanying drawings and the following detailed description, in which a specific embodiment of the invention is set forth by way of illustration rather than by way of limitation.

IN THE DRAWING

Figure 1:
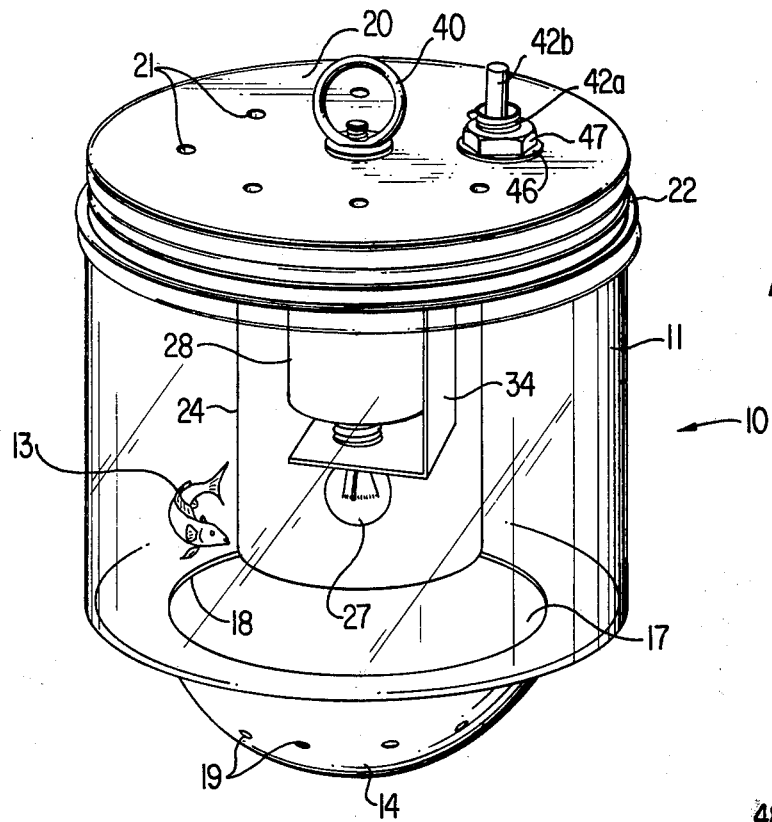
FIG. 1 is a perspective view of the composite fisherman's lure.

Referring to the drawing, the composite fisherman's lure is generally designated by the reference numeral 10. Such lure comprises a transparent outer jar 11 which provides a housing enclosing a chamber 12 for live bait, such as minnows 13, and is also provided with a perforated base portion 14 for stink bait 15 such as shrimp, soft shell crabs or the like, the odor of which serves to attract fish to the lure.

The outer jar 11 is preferably cylindrical in form and is composed of transparent and somewhat flexible plastic material which in not readily breakable and which permits fish to see the live bait 13 swimming within the compartment or chamber 12. A bottom 16 for the jar is provided with an opening 17 having an outwardly extending flange 18 over which snugly fits the periphery of the perforated base portion 14 containing dead bait, which base portion 14 is shown as hemi-spherical in form and may be of flexible plastic material similar to the jar casing 11 and may be either transparent or opaque as the fish will be primarily attracted by the odor which is emitted from the perforations or openings 19 in the rounded bait holder or base portion 14.

The outer jar 11 is provided with a bright colored lid 20 which is provided with perforations 21, either in the form of slits or rounded openings, to permit water to enter the jar so as to permit minnows or the like to swim about within the live bait compartment 12. The lid 20 is provided with a screw-threaded flange 22 which is adapted to engage in similarly threaded upper portion or flange 23 of the jar 11, as in the well known Mason jar. The lid is brightly colored so as to flash sunlight and may be provided with a coating of aluminum, gilt or silver coating material.

Axially suspended from the lid 20 of the outer jar is an inner light containing jar 24 which may be similar in shape to the outer jar and may be composed of transparent glass rather than plastic. Moreover, as in the case of the outer jar 11, the inner jar 24 is provided with a screw lid 25 similar to but smaller than the lid 20 of the outer jar. The inner jar lid 25 is provided with an interiorly screw threaded flange 25a which engages the exteriorly threaded upper portion, or flange 24a of the inner jar. Suitably sealed within the inner jar is a light means 27 preferably of the flashing type. As shown, the light means 27 comprises a blinker or flasher bulb powered by a battery 28. The battery is suspended by bracket means 29 which is suitably supported by the lid of the outer jar by means which will be more fully described hereinafter.

The bracket means 29 includes an upper horizontal portion 30 which extends over the top of the battery 28, and a vertical portion 31 extending downwardly the full length of the battery 28 and terminating in a horizontal battery holding bottom flange 32. The bracket also includes suitable intermediate spring arm portions 33 embracing the battery 28.

A second battery means 34 serves to support the blinkertype bulb 27. Such bracket means 34 may be similar to the battery supporting bracket means 29 previously described and comprises an upper horizontal portion 35 above the horizontal portion 30 of the battery supporting bracket means 29, but spaced therefrom, and includes also a depending portion 36 and a lower lamp supporting portion 37.

The brackets 29 and 34 may be of metal and are spaced from each other and from the lid 25 of the inner jar by means of compressible gaskets 38 and 39 respectively which are composed of electrical insulating material.

Figure 2:
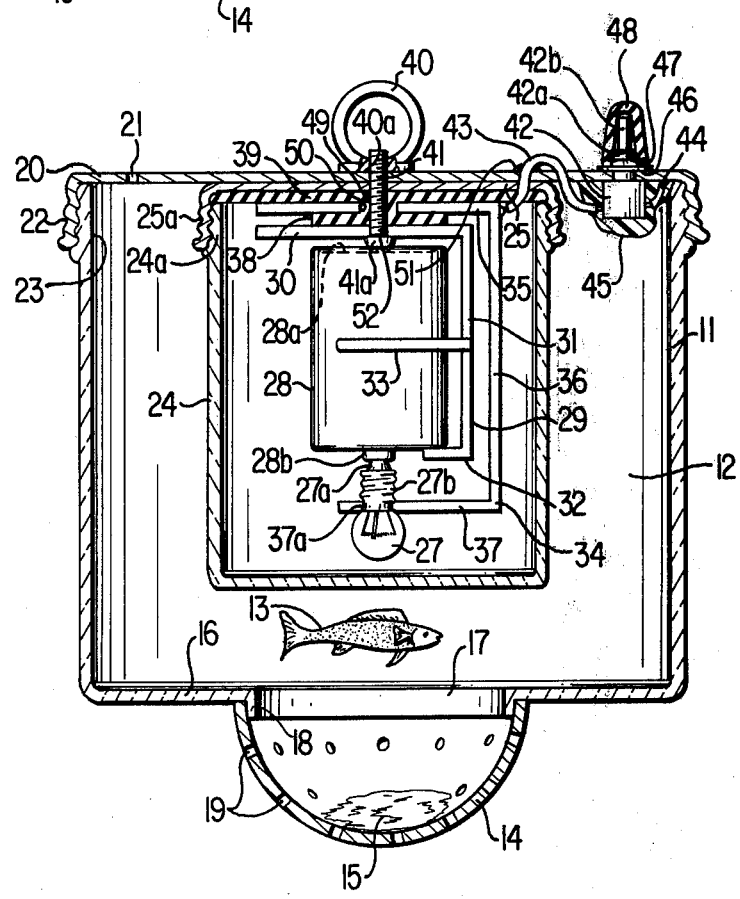
FIG. 2 is a vertical section of the same.

As shown, the light assembly including the lamp 27, battery 28, brackets 29 and 34, and gaskets 38 and 39 are clamped to the under wall of the lid 25 of the inner jar by suitable supporting means comprising a ring-out 40 and a threaded stem portion 41 which extends through openings 52 and 50 in the horizontal portions 30 and 31 of the battery and lamp holding brackets respectively and through openings in the lids 20 and 25. The stem portion 41 has an enlarged head 41a which is positioned beneath the horizontal battery bracket arm 30. When the ring-nut 40 is screwed onto the end of the stem 41 projecting above the outer lid 20, as shown in FIG. 2, it draws the stem portion 41 upwardly and clamps the brackets 29 and 30 and the inner lid 25 tightly against the underside of the outer lid 20 and compresses the gaskets 38 and 39. The gasket 39 covers the entire under side of the lid 25 and its outer margin rests on top of the upper portion 24a of the inner jar 24. The gasket 39 thus serves as a waterproof seal to prevent water from entering the inner jar. The gasket 39 also spaces the inner lid 25 from the bracket arm 35, while the gasket 38 spaces the bracket arm 35 from the bracket arm 30. The bracket arm 35 has a hole 50 of larger diameter than the diameter of the threaded stem 41 which passes through it. The hole 50 is filled with an annular gasket 49 which spaces the stem 41 from the circular edge of the bracket arm 35 surrounding the hole 50. The gaskets, 38, 39, and 49 are of electrical insulating material and serve to electrically insulate the bracket arms 30 and 35 from each other and from the inner lid 25. The ring-nut 40 coacts with the stem portion 41 and also serves to suspend the inner jar 24 from the lid 20 of the outer jar. As the stem 41 is axially disposed within the outer jar 11, the inner jar 24 and its contents are concentric with the outer jar. Thus the light from the flashing bulb 27 provides illumination for the surrounding minnow container and thus serves to effectively attract fish.

The ring-nut 40 provides a handle to which a cord or other flexible means may be attached (not shown) so as to support the lure from a boat, wharf or the like. Such flexible attaching means permits the tide, waves, or wind to agitate the lure, thus further tending to attract fish to the lure.

The blinker lamp 27 has a screw threaded metal base 27b and a base contact 27a which is coaxial with and insulated from the screw threaded base 27b in conventional manner. The filament inside the lamp 27 is connected between the base contact 27a and the screw threaded base 27b. A bimetallic thermal switch is located inside the lamp in series with the filament or a portion thereof to periodically open and close the circuit to the lamp filament. Blinker lamps including a bimetallic switch to automatically make and break the lamp filament circuit are well known and need not be further described. This invention is not limited to the use of a blinker lamp including a bimetallic switch encased in the lamp as other blinker lamp systems may be substituted which will cause a flashing light to attract fish. For example, the lamp 27 may be a conventional flashlight bulb and a blinker switch may be located outside of the lamp in the lamp circuit. The metal base 27b of the lamp 27 is screwed into an aperture 37a formed in the bracket arm 37 until the base contact 27a engages the center pole 28b of the battery 28.

An on-off switch 42 is mounted in the lid 20 by means of a threaded stem 42a which extends through an opening in the lid and a nut 47 which engages over the threaded stem and clamps the switch in place. A washer 46 is preferably provided between the nut 47 and the lid 20. The switch 42 is electrically connected on one side by a conductor 43 to the bracket 34 and is electrically connected on its other side to the metal lid 20 by conductor 44. The conductor 43 extends outwardly through the lids 25 and 20 and reenters the outer jar 11 through the lid 20 as shown in FIG. 2. The holes in the lids 20 and 25 through which the conductor 43 passes are sealed with a suitable sealer compound such as the General Electric Company's silicon sealer indicated at 51. Also the switch 42 within the outer jar is encased with silicon sealer as indicated at 45. The on-off switch 42 has a handle 42b which projects outside of the jar 11 so that a person can operate the switch at will to turn the lamp on or off. A waterproof cover 48 is shown in FIG. 42 encasing the handle 42b. The metal lid 20 of the outer jar provides electrical connection between the conductor 44 on one side of the on-off switch 42 and the metal case of the flashlight battery through the threaded stem 52. The circuit is completed to the other side of switch 42 through the center pole of the battery, the blinker lamp 27, bracket 34 and conductor 43.

In use, the lure may be hung from a boat or other support by a flexible cord and submerged in a pond or other body of water. Fish may be attracted by any one of the fish attractors including the live minnows 13, stink bait 15, blinking light 27, colored lid 20, or the motion of the lure in the water.

The invention has been described in detail for the purpose of illustration but it will be obvious that numerous modifications and variations may be resorted to without departing from the spirit of the invention in its broadest aspects.

What is claimed is:

1. A composite fishing lure comprising an outer transparent container adapted to receive live bait and having apertures therein to permit entry and exit of water, an inner transparent container concentric with the outer container and secured thereto, illuminating means within the inner container, insulating means to prevent entry of water to the inner container and control means for said illuminating means, said inner and outer containers comprising jars of transparent material, each having a lid, the lid of the inner container being in contact with the lid of the outer container, said illuminating means comprising a blinker light and battery means therefor suspended within the inner jar, bracket means for supporting the battery and separate bracket means for supporting the blinker light, each bracket having a flat supporting portion parallel to the inner jar lid, the supporting portion of the light bracket being superimposed above the supporting portion of the battery bracket, gasket means separating the supporting portions of the lamp and battery brackets respectively and other gasket means interposed between the supporting portion of the light bracket and the under surface of the inner jar lid, and suspending means for said inner jar and battery and light brackets comprising a bolt having a threaded stem extending through the jar lids, brackets, and gaskets, and a ring nut engaging said bolt outside of said outer lid.

* * * * *